(12) United States Patent
Ohsawa et al.

(10) Patent No.: US 12,140,440 B2
(45) Date of Patent: Nov. 12, 2024

(54) MOVEMENT ASSISTANCE DEVICE AND MOVEMENT ASSISTANCE METHOD

(71) Applicant: Nissan Motor Co., Ltd., Yokohama (JP)

(72) Inventors: Takeaki Ohsawa, Kanagawa (JP); Akihiko Ebina, Kanagawa (JP); Yuji Takada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 235 days.

(21) Appl. No.: 17/910,389

(22) PCT Filed: Mar. 22, 2021

(86) PCT No.: PCT/IB2021/000168
§ 371 (c)(1),
(2) Date: Sep. 9, 2022

(87) PCT Pub. No.: WO2021/198767
PCT Pub. Date: Oct. 7, 2021

(65) Prior Publication Data
US 2023/0221130 A1    Jul. 13, 2023

(30) Foreign Application Priority Data
Mar. 30, 2020    (JP) .................................. 2020-060535

(51) Int. Cl.
*G01C 21/34*    (2006.01)
*G01C 21/36*    (2006.01)
(52) U.S. Cl.
CPC ..... *G01C 21/3461* (2013.01); *G01C 21/3682* (2013.01)

(58) Field of Classification Search
CPC . G01C 21/34; G01C 21/3461; G01C 21/3682
(Continued)

(56) References Cited

U.S. PATENT DOCUMENTS 6,118,389 A * 9/2000 Kamada ............. G01C 21/3415
701/413
9,625,266 B1 * 4/2017 Chintakindi ....... G01C 21/3484
(Continued)

FOREIGN PATENT DOCUMENTS

CN    101082500 A    12/2007
CN    108986446 A    12/2018
(Continued)

*Primary Examiner* — Atul Trivedi
(74) *Attorney, Agent, or Firm* — Global IP Counselors, LLP

(57) ABSTRACT

A movement assistance device guides a user to a meeting location for meeting a vehicle. The movement assistance device calculates a first required time until the vehicle arrives at the meeting location, and a plurality of routes from the user's current location to the meeting location. The movement assistance device calculates a second required time for the user to arrive at the meeting location from the user's current location for each route. The movement assistance device then determines the route associated with the second required time as a route via which the vehicle could be met on time when a second required time is the same as or shorter than the first required time. The movement assistance device then causes the communication device to output information that indicates the route or routes determined to be the route or routes via which the vehicle could be met on time.

6 Claims, 17 Drawing Sheets

(58) Field of Classification Search
USPC .......................................................... 701/465
See application file for complete search history.

(56) References Cited

U.S. PATENT DOCUMENTS

| | | | | |
|---|---|---|---|---|
| 2002/0049534 | A1* | 4/2002 | Yuda | G01C 21/365 |
| | | | | 340/990 |
| 2006/0167626 | A1* | 7/2006 | Hashizume | G08G 1/096844 |
| | | | | 701/414 |
| 2009/0030601 | A1* | 1/2009 | Sawaki | G01C 21/3632 |
| | | | | 701/457 |
| 2009/0265097 | A1* | 10/2009 | Adachi | G01C 21/3694 |
| | | | | 701/465 |
| 2011/0210865 | A1* | 9/2011 | Lee | G08G 3/02 |
| | | | | 340/903 |
| 2011/0264366 | A1* | 10/2011 | Cabral | G01C 21/3415 |
| | | | | 701/533 |
| 2017/0176192 | A1* | 6/2017 | Cardoso de Moura | |
| | | | | H04W 4/024 |
| 2018/0018635 | A1 | 1/2018 | Suzuki | |
| 2018/0341261 | A1* | 11/2018 | Kislovskiy | G06N 20/00 |
| 2018/0364062 | A1* | 12/2018 | Wang | G06Q 10/063114 |
| 2019/0120640 | A1* | 4/2019 | Ho | G01C 21/3492 |
| 2019/0120967 | A1* | 4/2019 | Smits | G01C 21/3626 |
| 2019/0156254 | A1* | 5/2019 | Hansen | G06Q 10/02 |
| 2019/0390971 | A1* | 12/2019 | Shaginyan | G01C 21/3492 |
| 2020/0011671 | A1* | 1/2020 | Puri | G01C 21/20 |
| 2020/0378771 | A1* | 12/2020 | Beaurepaire | G06Q 30/0284 |
| 2020/0378775 | A1* | 12/2020 | Beaurepaire | G01C 21/3423 |
| 2020/0378781 | A1* | 12/2020 | Kantarjiev | G01C 21/3691 |
| 2022/0276066 | A1* | 9/2022 | Beaurepaire | G01C 21/3492 |
| 2023/0249711 | A1* | 8/2023 | Hardy | B60W 30/18145 |
| | | | | 701/24 |
| 2023/0296388 | A1* | 9/2023 | Gage | G01C 21/3415 |
| | | | | 701/533 |

FOREIGN PATENT DOCUMENTS

| | | | | |
|---|---|---|---|---|
| CN | 110070251 | A | 7/2019 | |
| CN | 116358584 | A * | 6/2023 | |
| GB | 2539558 | A * | 12/2016 | ......... G01C 21/3438 |
| JP | 2005-275678 | A | 10/2005 | |
| JP | 2013-130544 | A | 7/2013 | |
| JP | 2018-9904 | A | 1/2018 | |
| JP | 2019-128659 | A | 8/2019 | |
| JP | 2019196103 | A * | 11/2019 | ............ B63H 21/21 |
| WO | WO-2019231521 | A1 * | 12/2019 | ............ B60W 50/00 |
| WO | WO-2023047610 | A1 * | 3/2023 | |
| WO | WO-2023072207 | A1 * | 5/2023 | |

* cited by examiner

MOVEMENT ASSISTANCE DEVICE AND MOVEMENT ASSISTANCE METHOD

CROSS-REFERENCE TO RELATED APPLICATIONS

This application is a U.S. national stage application of International Application No. PCT/IB2021/000168, filed on Mar. 22, 2021. This application claims priority to Japanese Application No. 2020-060535, filed on Mar. 30, 2020.

BACKGROUND

Technical Field

The present invention relates to a movement assistance device and a movement assistance method.

Background Information

A technology for guiding a user to a meeting location where the user is to meet a vehicle is known from Japanese Laid-Open Patent Application No. 2013-130544

SUMMARY

However, the technology disclosed in Patent Document 1 only presents the user with one route. The user cannot select a route other than the presented route, and thus has few options regarding movement.

In view of the problem described above, an object of the present invention is to provide a movement assistance device and a movement assistance method that present at least one route to a meeting location.

A movement assistance device according to an embodiment of the present invention that acquires location information of a communication device in the possession of a user and location information of a vehicle dispatched in accordance with the user's dispatch request calculates, based on the location information of the vehicle, a first required time, which is the time required for the vehicle to arrive at a meeting location where the user who made the dispatch request is to board the vehicle; calculates, based on the location information of the communication device, a plurality of routes from a current location of the user to the meeting location; calculates a second required time, which is the time required to arrive at the meeting location from the current location of the user, for each of the plurality of calculated routes; determines that if the second required times are the same as or shorter than the first required time, the routes associated with the second required times are routes via which the vehicle could be met on time; and causes the communication device to output information that indicates the route or routes determined to be the route or routes via which the vehicle could be met on time.

With the present invention, it is possible to present at least one route to a meeting location to the user.

BRIEF DESCRIPTION OF THE DRAWINGS

Referring now to the attached drawings which form a part of this original disclosure.

DETAILED DESCRIPTION OF EMBODIMENTS

Figure 1:
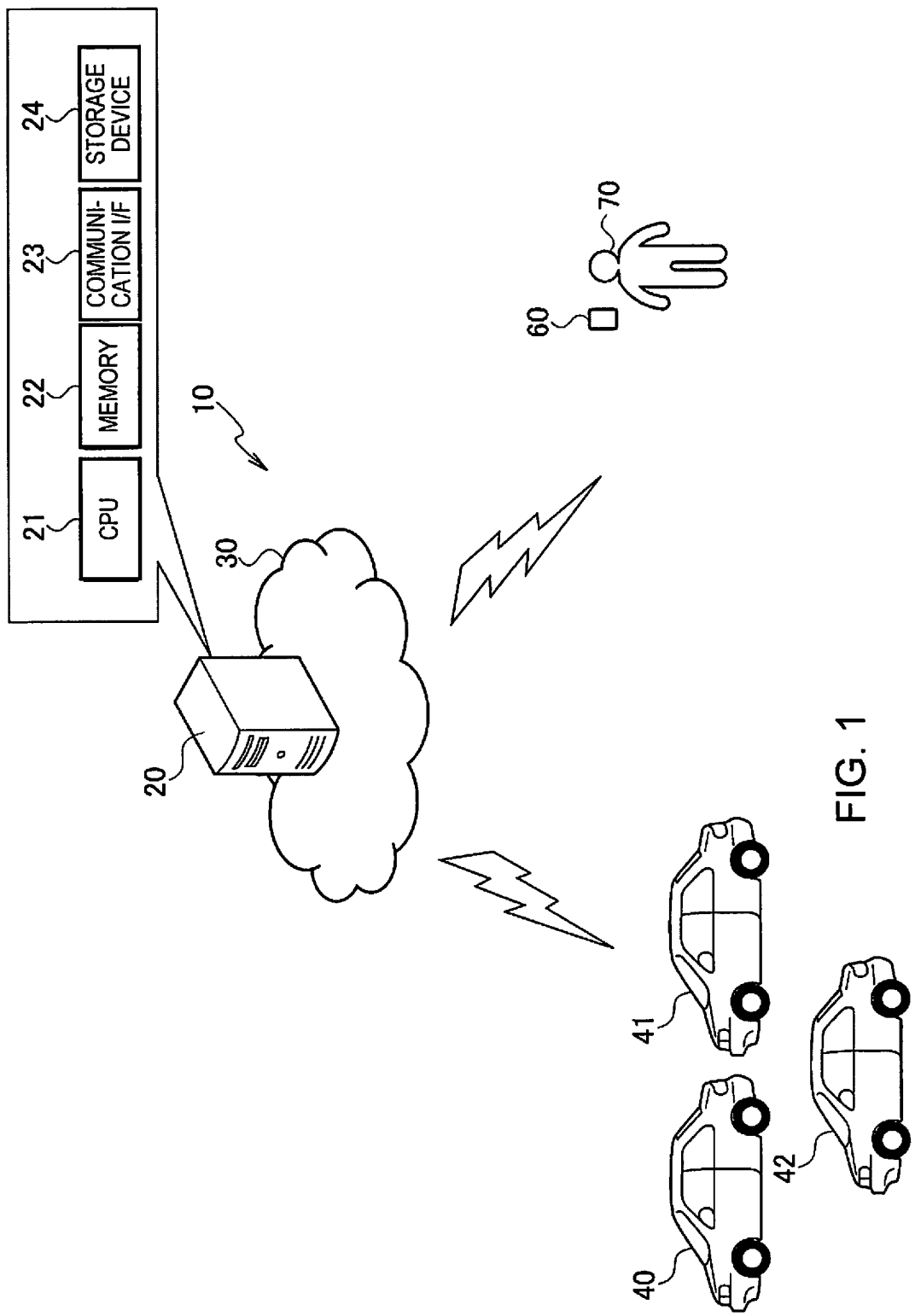
FIG. 1 is an overall schematic view of a movement assistance system 10 according to an embodiment of the present invention.

An embodiment of the present invention is described below with reference to the figures. In the descriptions of the figures, identical parts have been assigned the same reference numerals, and their descriptions have been omitted.

A configuration example of a movement assistance system 10 according to the present embodiment will be described with reference to FIGS. 1 to 2. As shown in FIG. 1, the movement assistance system 10 includes a management server 20, a communication network 30, taxis 40 to 42, a user 70, and a communication device 60 in the possession of the user 70. In FIG. 1, there are three taxis, but no limitation is implied thereby. The movement assistance system 10 may include four or more taxis.

The management server 20 communicates with the taxis 40 to 42 and the communication device 60 via the communication network 30. The management server 20 is a general-purpose computer equipped with a CPU (Central Processing Unit) 21, a memory 22, a communication I/F 23, and a storage device 24; these constituent elements are electrically connected via a bus, etc., not shown in the figure. The management server 20 is used in a dispatch service for the taxis 40 to 42. Although the installation location of the management server 20 is not particularly limited, the management server 20 is installed, for example, in the control center of the business that operates the taxis 40 to 42.

The CPU 21 reads various programs stored in the storage device 24, etc., into the memory 22 and executes various instructions contained in the programs. The memory 22 is a storage medium such as a ROM (Read Only Memory), RAM (Random Access Memory), etc. The storage device 24 is a storage medium such as an HDD (Hard Disk Drive). Some (or all) of the movement assistance system 10, including the functions of the management server 20 described below may be provided by means of an application (Software as a Service (SaaS), etc.) located on the communication network 30.

The communication I/F 23 is implemented as hardware, such as a network adapter, various types of communication software, or a combination thereof, and is configured to realize wired or wireless communication via the communication network 30, etc. Further, the communication I/F 23 functions as an input/output unit for sending and receiving data.

The communication network 30 may be configured by a wireless and/or wired method, and the communication network 30 may include the Internet. In this embodiment, the management server 20, the taxis 40 to 42, and the communication device 60 are connected to the communication network 30 by using a wireless communication method.

In this embodiment, the taxis 40 to 42 are described as autonomous driving vehicles without a driver. Therefore, the taxis 40 to 42 may be described as robot taxis or unmanned taxis. However, the taxis 40 to 42 are not limited to autonomous driving vehicles without drivers. The taxis 40 to 42 may be ordinary vehicles with drivers.

The user 70 requests (reserves) a taxi using the communication device 60. A vehicle dispatch application (hereinafter referred to simply as a vehicle dispatch app) used for reserving taxis is installed in the communication device 60, and the user 70 requests a taxi using the vehicle dispatch app.

Next, with reference to FIG. 2, detailed configurations of the management server 20, the taxi 40, and the communication device 60 will be described. Although the taxis 41 and 42 have been omitted from FIG. 2, the taxis 41 and 42 are configured in the same manner as the taxi 40.

The communication device 60 comprises a communication I/F 601, a vehicle dispatch app 602, a GPS receiver 603, and a display 604. The communication I/F 601 has the same configuration as the communication I/F 23 (refer to FIG. 1) and communicates with the management server 20 via the communication network 30. The communication device 60 is a portable device such as a smartphone or a tablet. The communication device 60 may also be a wearable device. Although not shown in the figure, the communication device 60 comprises a CPU (controller), memory, storage device, etc., in the same manner as the management server 20.

The vehicle dispatch app 602 is used for requesting a taxi, as described above. The vehicle dispatch app 602 functions as a user interface when the user 70 requests a taxi. The vehicle dispatch app 602 is realized by the CPU provided in the communication device 60 reading and executing a dedicated application program from a storage device provided in the communication device 60. When the user 70 requests a taxi, the user 70 inputs a desired boarding location, boarding time, deboarding location, etc., into the vehicle dispatch app 602 to request a taxi. The vehicle dispatch app 602 transmits a dispatch request to the management server 20 in accordance with the input from the user 70. Further, the communication device 60 displays on the display 604 various types of information (dispatch request receipt, scheduled arrival time, scheduled travel route, etc.) included in the signal returned from the management server 20 in response to the dispatch request. However, the method of realizing the vehicle dispatch app 602 is not limited in this way. For example, the communication device 60 may access a server that provides the functions of the vehicle dispatch app 602, receive the functions provided, and display the results of executing the functions transmitted from the server in a browser.

The location information of the communication device 60 acquired by the GPS receiver 603 is transmitted to the management server 20 at any given time.

The taxi 40 is equipped with a communication I/F 401, a vehicle ECU (Electronic Control Unit) 402, and a GPS receiver 403. The communication I/F 401 has the same configuration as the communication I/F 23 and the communication I/F 601, and communicates with the management server 20 via the communication network 30. The vehicle ECU 402 is a computer for controlling the taxi 40. The vehicle ECU 402 controls various actuators (brake actuator, accelerator pedal actuator, steering actuator, etc.) based on the commands received from the management server 20. The location information of the taxi 40 acquired by the GPS receiver 403 is transmitted to the management server 20 at any given time.

Figure 2:
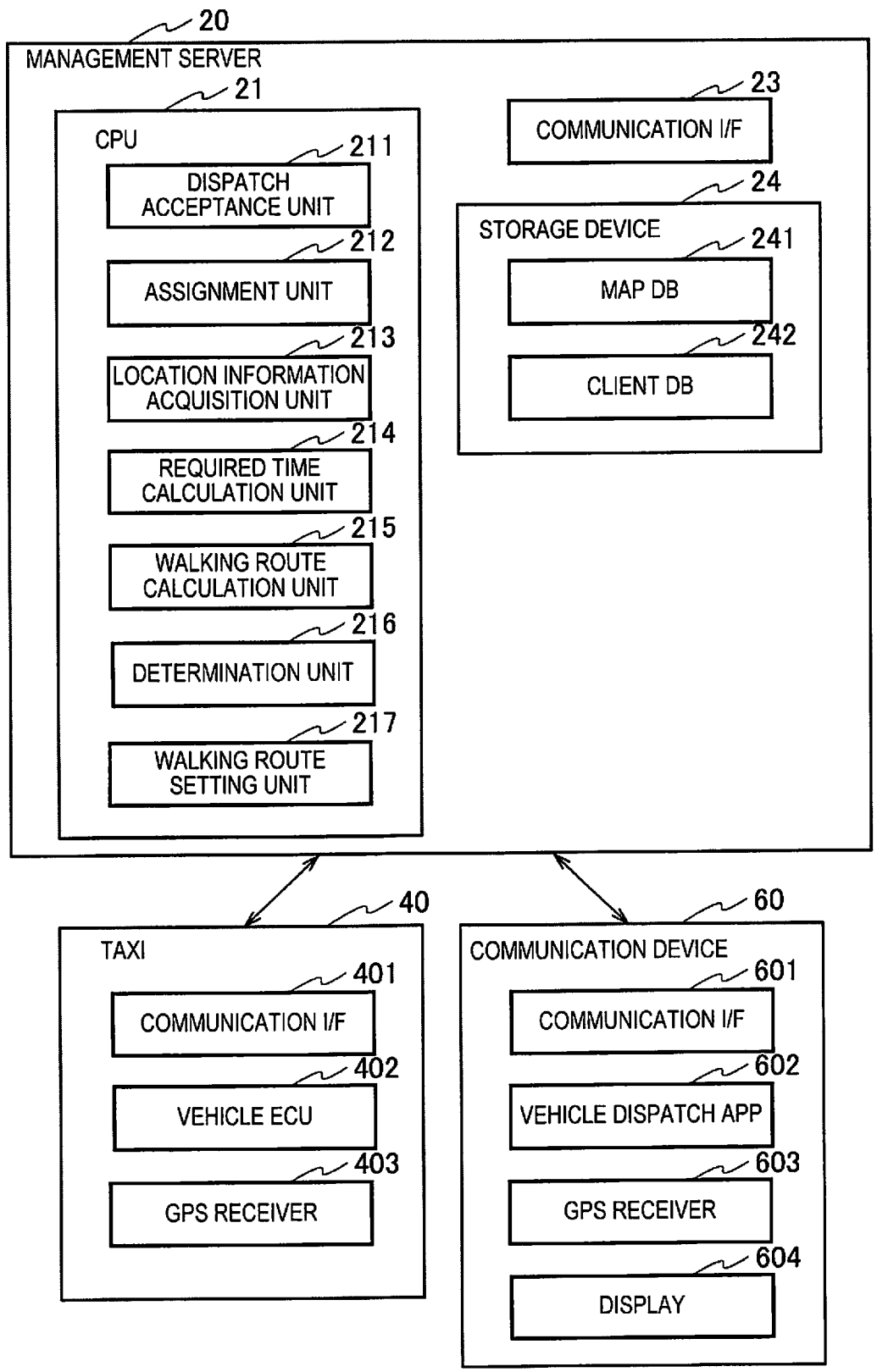
FIG. 2 is a functional block diagram of a management server 20, a communication device 60, and a taxi 40 according to the embodiment of the present invention.

As shown in the block diagram of FIG. 2, the CPU 21 (the controller) of the management server 20 is provided with, as examples of the plurality of functions, a vehicle dispatch acceptance unit 211, an assignment unit 212, a location information acquisition unit 213, a required time calculation unit 214, a walking route calculation unit 215, a determination unit 216, and a walking route setting unit 217. As shown in FIG. 2, a map database 241 and a client database 242 are stored in the storage device 24 of the management server 20.

The map information required for route guidance, such as road information and facility information, is stored in the map database 241. The map information includes the number of lanes on a road, road width information, and road undulation information. The map information also includes road signs indicating the speed limit, one-way streets, etc., as well as road markings indicating pedestrian crossings, lane markings, etc. The map information may also include information related to road structures (for example, traffic signals and telephone poles), buildings, and other facilities.

The client database 242 stores account information, such as the ID of the user 70, taxi usage history, and attributes of the user 70.

The dispatch acceptance unit 211 accepts a dispatch request from the user 70 entered into the communication device 60. The dispatch acceptance unit 211 has the function of notifying the communication device 60 of the acceptance of the dispatch request from the user 70, as well as of the scheduled arrival time to the boarding location, the scheduled travel route to the boarding location, etc.

The assignment unit 212 assigns a suitable taxi from among the plurality of taxis 40 to 42 (refer to FIG. 1) based on the accepted dispatch request. For example, for reasons of efficiency, the dispatch acceptance unit 211 can assign the unoccupied taxi that, of the plurality of taxis 40 to 42, is closest to the boarding location desired by the user 70. In the present embodiment, it is assumed that the taxi 40 has been assigned.

The assignment unit 212 also sets a travel route from the current location of the taxi 40 to the boarding location desired by the user 70 by referencing the map database 241 and sends an instruction to the taxi 40 to travel to the boarding location desired by the user 70 via the set travel route. The travel route calculated by the assignment unit 212 is, for example, the route via which the boarding location desired by the user 70 can be reached from the current location of the taxi 40 in the shortest amount of time. The assignment unit 212 outputs the set travel route to the required time calculation unit 214.

The location information acquisition unit 213 acquires the location information of the user 70 from the communication device 60 and acquires location information of the taxi 40 from the taxi 40. The location information of the user 70 means the location information of the communication device 60 in the possession of the user 70. The location information acquisition unit 213 outputs the acquired location information to the required time calculation unit 214.

The required time calculation unit 214 (the first required time calculation unit, the second required time calculation unit) uses the travel route acquired from the assignment unit 212 and the location information of the taxi 40 acquired from the location information acquisition unit 213 to calculate a first required time or time required for the taxi 40 to arrive at the boarding location desired by the user 70 from its current location The required time calculation unit 214 outputs this calculated first required time to the determination unit 216.

The walking route calculation unit 215 uses the map database 241 and the location information of the user 70 acquired from the location information acquisition unit 213 to calculate walking routes. In the present embodiment, a walking route is a route that the user 70 can take on foot from the current location of the user 70 to the boarding location. The walking route calculation unit 215 calculates a plurality of walking routes to the boarding location. The required time calculation unit 214 also calculates a second required time, which is the time required for the user 70 to arrive at the boarding location from his or her current location, for each of the plurality of walking routes calculated by the walking route calculation unit 215. The required time calculation unit 214 outputs these calculated second required times to the determination unit 216. Each second required time is associated with the corresponding walking route.

The determination unit 216 determines whether the user 70 can be on time to meet the taxi 40 using the first required time and the second required times obtained from the required time calculation unit 214. For example, if a second required time is shorter than the first required time, the determination unit 216 determines that the user 70 can be on time to meet the taxi 40. Further, if a second required time and the first required time are the same, the determination unit 216 determines that the user 70 can be on time to meet the taxi 40. Here, "a second required time and the first required time are the same" does not imply an exact equivalence. "A second required time and the first required time are the same" means that the times are essentially the same (i.e., approximately the same) and that a difference of several seconds is negligible.

In the present embodiment, "the user 70 can be on time to meet the taxi 40" means that the user 70 can arrive at the boarding location ahead of the taxi 40. Alternatively, "the user 70 can be on time to meet the taxi 40" can mean that the user 70 and the taxi 40 may arrive at the boarding location at the same time (or approximately the same time).

If it is determined that the user 70 can be on time to meet the taxi 40, the determination unit 216 outputs the walking routes associated with the second required times used to arrive at this determination to the walking route setting unit 217.

The walking route setting unit 217 sets the walking routes acquired from the determination unit 216 as the walking routes to be presented to the user 70 and transmits a signal indicating the set walking routes to the communication device 60 in the possession of the user 70 via the communication I/F 23.

Details of the walking route will now be described with reference to FIG. 3.

Figure 3:
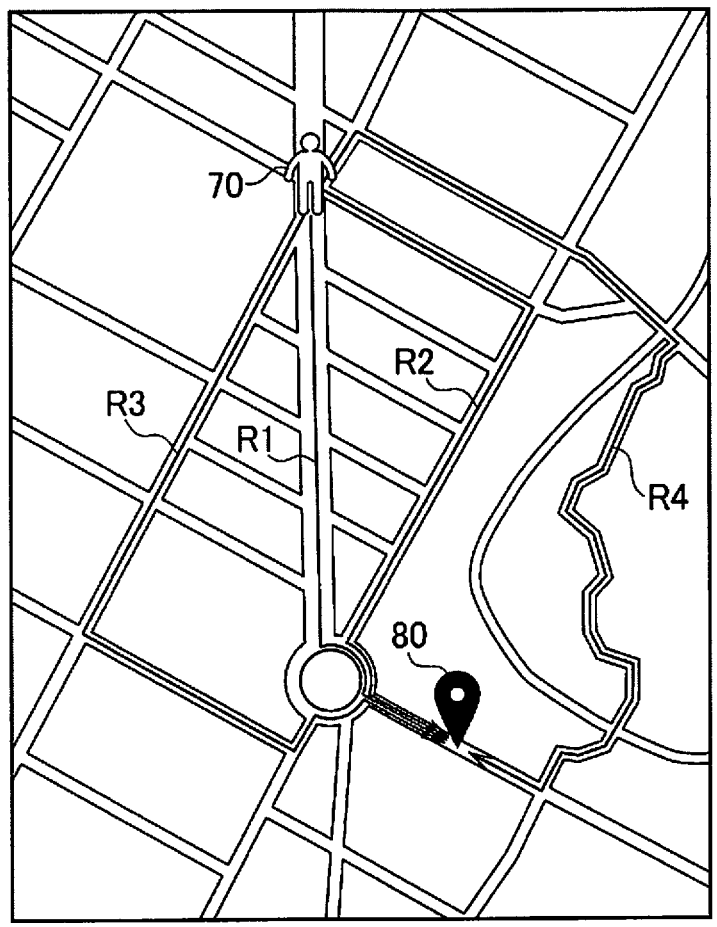
FIG. 3 is a diagram describing a walking route according to the embodiment of the present invention.

It is assumed that the user 70 shown in FIG. 3 requests a taxi using the vehicle dispatch app 602. Reference numeral 80 in FIG. 3 indicates the boarding location desired by the user 70. That is, reference numeral 80 indicates the location where the user 70 is to meet the taxi 40. Reference numeral 80 is hereafter designated as meeting location 80. The taxi 40 travels to the meeting location 80 in order to board the user 70 based on a command received from the management server 20. The taxi 40 is omitted in FIG. 3.

As described above, the required time calculation unit 214 uses the travel route acquired from the assignment unit 212 and the location information of the taxi 40 acquired from the location information acquisition unit 213 to calculate a first required time, which is the time required for the taxi 40 to arrive at the meeting location 80 from its current location. In the following description, it is assumed that the first required time has been calculated as 8 minutes.

As shown in FIG. 3, the walking route calculation unit 215 uses the map database 241 and the location information of the user 70 acquired from the location information acquisition unit 213 to calculate walking routes R1 to R4. Walking routes R1 to R4 are routes that the user 70 can take on foot from the current location of the user 70 to the meeting location 80.

The required time calculation unit 214 calculates a second required time, which is the time required to arrive at the meeting location 80 from the current location of the user 70, for each of the walking routes R1 to R4 calculated by the walking route calculation unit 215. It is assumed only in FIG. 3 that the second required times for traversing the walking routes are calculated as 5 minutes for the walking route R1, 6 minutes for the walking route R2, 7 minutes for the walking route R3, and 9 minutes for the walking route R4.

The determination unit 216 determines whether the user 70 can be on time to meet the taxi 40 using the first required time (8 minutes) and the second required times (R1: 5 minutes, R2: 6 minutes, R3: 7 minutes, R4: 9 minutes) acquired from the required time calculation unit 214. Since the taxi 40 will arrive at the meeting location 80 in 8 minutes, if the user 70 can arrive at the meeting location 80 within 8 minutes, the user can meet the taxi 40 on time.

Thus, the determination unit 216 determines whether there is a walking route via which the meeting location 80 can be reached within the first required time. For example, the determination unit 216 compares the first required time and a second required time, and if this second required time is shorter than the first required time, determines that the walking route associated with this second required time is a walking route via which the meeting location 80 can be reached within the first required time.

In FIG. 3, since the second required times (R1: 5 minutes, R2: 6 minutes, R3: 7 minutes) associated with the walking routes R1 to R3 are shorter than the first required time (8 minutes), the determination unit 216 determines that the walking routes R1 to R3 are the walking routes via which the meeting location 80 can be reached within the first required time. Since the second required time (9 minutes) associated with the walking route R4 is longer than the first required time (8 minutes), on the other hand, the determination unit 216 determines that the walking route R4 cannot be used to arrive at the meeting location 80 within the first required time. The determination unit 216 outputs the walking routes R1 to R3 (the walking routes via which the user 70 can meet the taxi 40 on time) to the walking route setting unit 217. Walking route R4, on the other hand, is deleted since it cannot be used to arrive at the meeting location 80 within the first required time.

The walking route setting unit 217 then sets the walking routes R1 to R3 acquired from the determination unit 216 as the walking routes to be presented to the user 70 and transmits a signal indicating the set walking routes R1 to R3 to the communication device 60 in the possession of the user 70 via the communication I/F 23.

Figure 4:
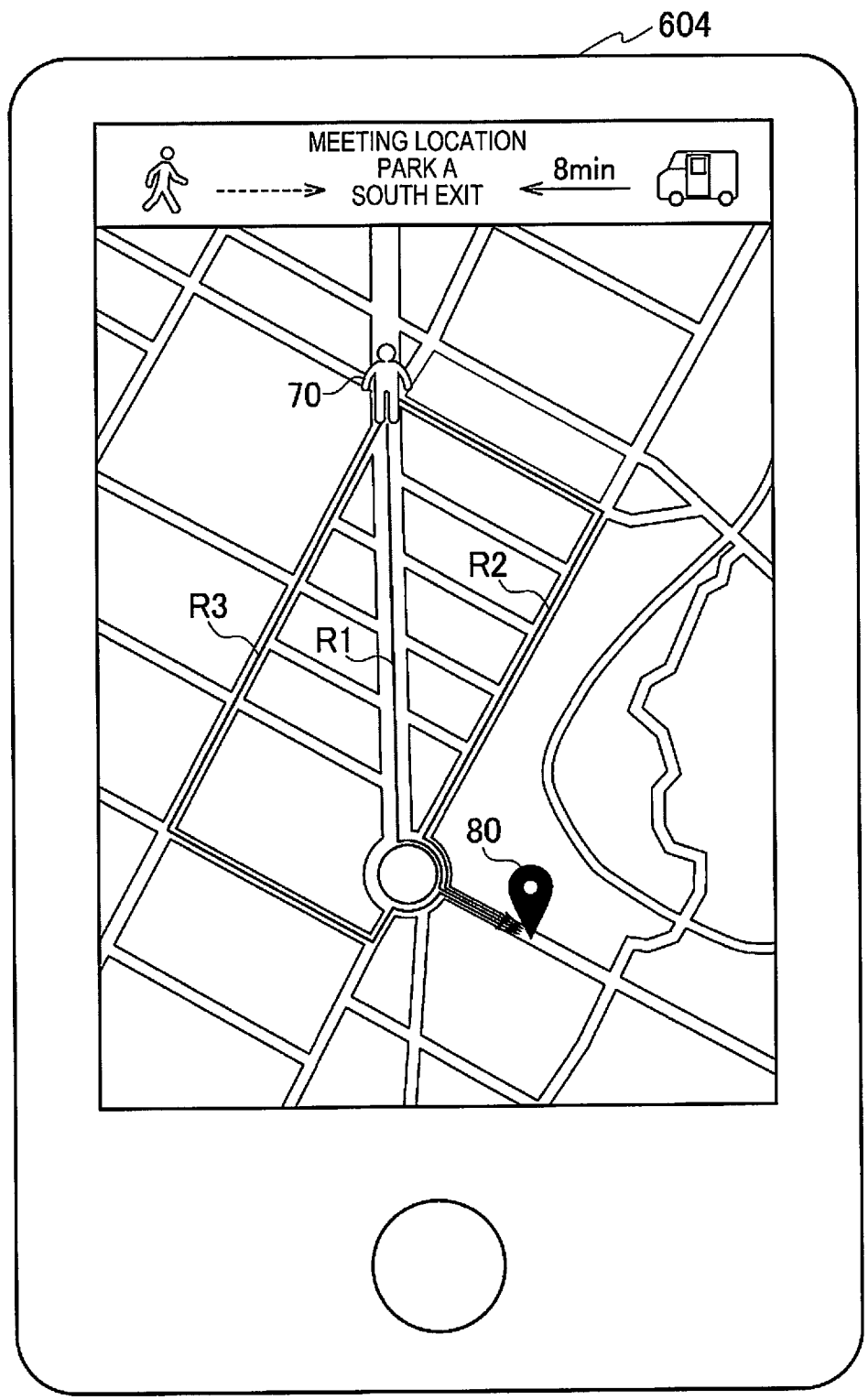
FIG. 4 is a diagram explaining an example of a walking route displayed on a display 604.

As shown in FIG. 4, walking routes R1 to R3 acquired from the management server 20 are displayed on the display 604 of the communication device 60. Regardless of which walking route of the walking routes R1 to R3 the user 70 selects, the user 70 can be on time to meet the taxi 40. By means of the present embodiment, a plurality of the walking routes R1 to R3 can be presented to the user 70 via which the taxi 40 can be met on time; thus, the user 70 can select his or her preferred route from the plurality of the walking routes R1 to R3. This increases the number of options that the user 70 can choose from when he/she departs for the meeting location 80. When the user 70 selects his/her preferred route, the user is guided along this route to the meeting location 80, as with a well-known navigation system.

Figure 5A:
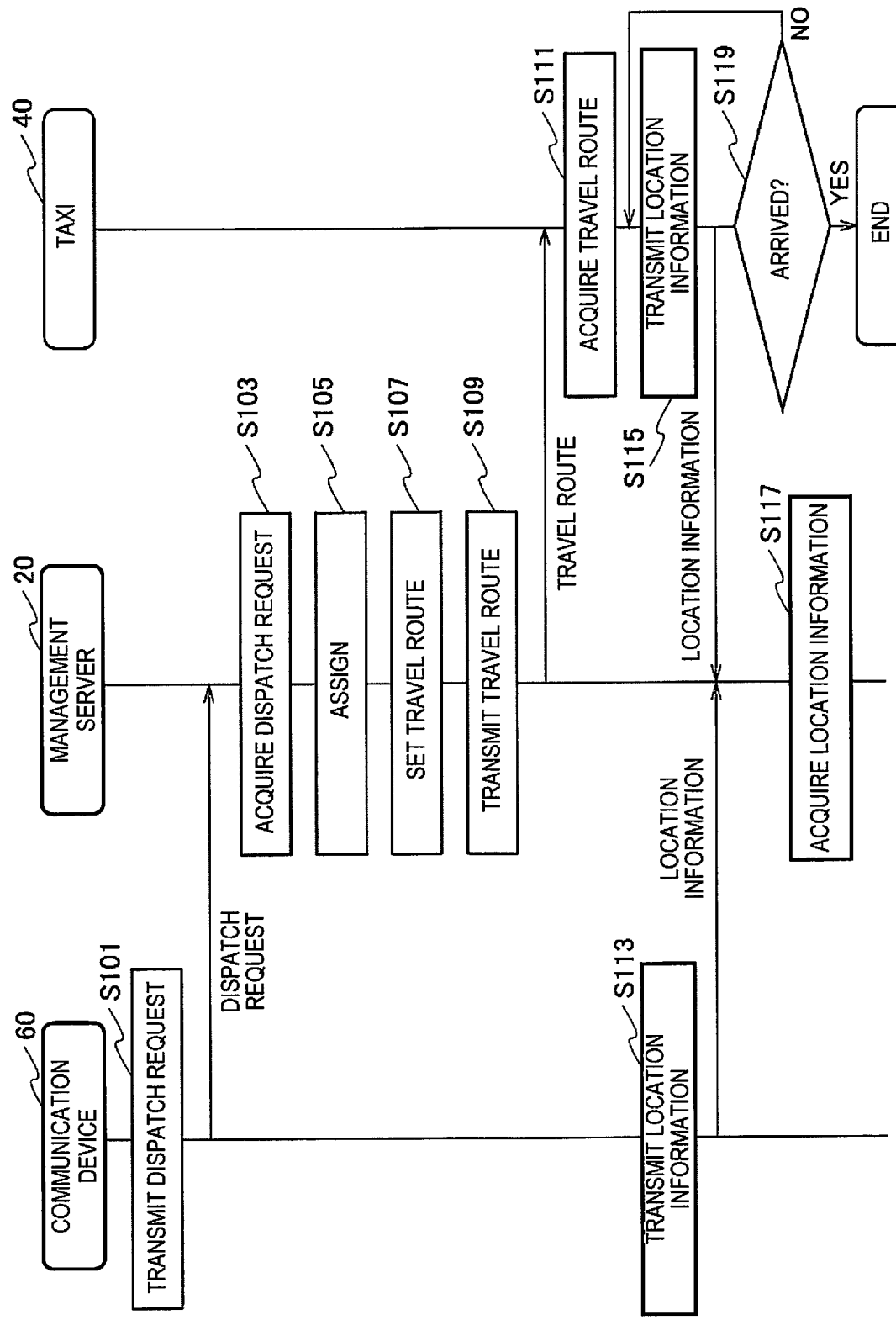
FIG. 5A is a sequence diagram explaining one operation example of the movement assistance system 10 according to the embodiment of the present invention.
Figure 5B:
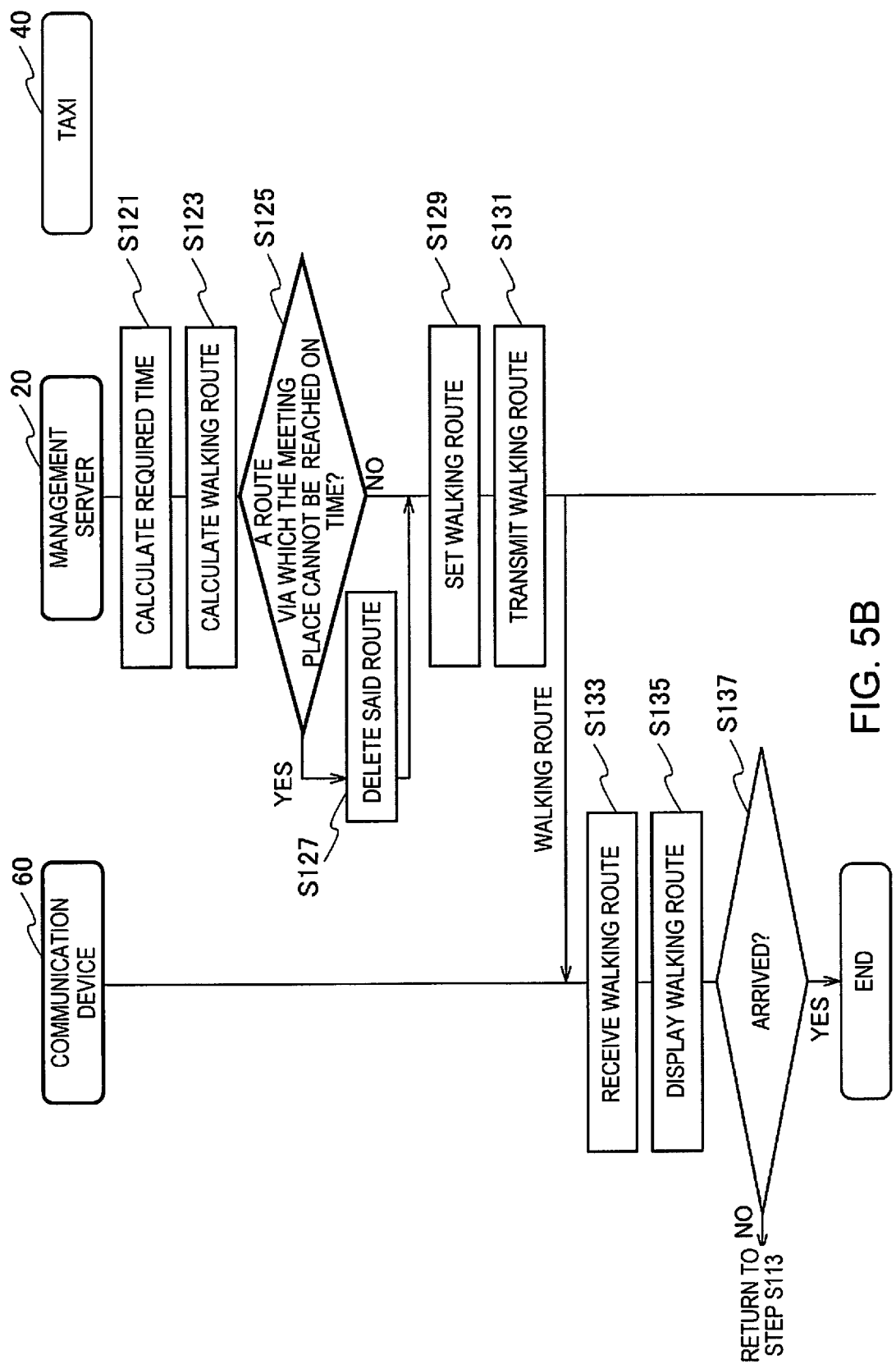
FIG. 5B is a sequence diagram explaining one operation example of the movement assistance system 10 according to the embodiment of the present invention.

An example of the operation of the movement assistance system 10 will now be explained with reference to the sequence charts of FIGS. 5A-5B.

In Step S101, the user 70 requests a taxi using the vehicle dispatch app 602. The process proceeds to Step S103, in which the dispatch acceptance unit 211 accepts the dispatch request of the user 70. The process proceeds to Step S105, in which the assignment unit 212 assigns an appropriate taxi from among the plurality of taxis 40 to 42 (refer to FIG. 1) based on the accepted dispatch request. The process proceeds to Step S107, in which the assignment unit 212 references the map database 241 and sets the travel route from the current location of the taxi 40 to the boarding location desired by the user 70 (meeting location 80).

The process proceeds to Step S109, in which the management server 20 transmits the set travel route to the taxi 40. The process then proceeds to Step S111, in which the taxi 40 travels to the meeting location 80 desired by the user 70 via the acquired travel route.

In Step S113, the communication device 60 transmits the location information of the communication device 60 acquired by the GPS receiver 603 to the management server 20. In Step S115, the taxi 40 transmits the location information of the taxi 40 acquired by the GPS receiver 403 to the management server 20. In Step S117, the management server 20 receives the location information transmitted from the communication device 60 and the taxi 40. The process of Step S115 is repeated until the taxi 40 arrives at the meeting location 80 (Step S119).

The process proceeds to Step S121, in which the required time calculation unit 214 calculates the first required time, i.e., the time required for the taxi 40 to arrive at the meeting location 80 from its current location. The process proceeds to Step S123, in which the walking route calculation unit 215 calculates the walking routes R1 to R4 (refer to FIG. 3) using the map database 241 and the location information of the user 70 acquired in Step S117.

The process proceeds to Step S125, in which the determination unit 216 determines whether any of the walking routes R1 to R4 calculated in Step S123 cannot be used to arrive at the meeting location 80 within the first required time. If there is a walking route R4, as is shown in FIG. 3, via which it is not possible to arrive at the meeting location 80 within the first required time (YES in Step S125), the process proceeds to Step S127, and the walking route R4 is deleted. If, on the other hand, there are the walking routes R1 to R3 via which the meeting location 80 can be reached within the first required time (NO in Step S125), the walking route setting unit 217 sets the walking routes R1 to R3 as the walking routes to be presented to the user 70 (Step S129). The process proceeds to Step S131, in which the walking route setting unit 217 transmits a signal indicating the set walking routes R1 to R3 to the communication device 60 in the possession of the user 70 via the communication I/F 23.

The process proceeds to Step S133, in which the communication device 60 receives a signal indicating the walking routes R1 to R3 transmitted from the management server 20. The process proceeds to Step S135, in which walking routes R1 to R3 are displayed on the display 604, as shown in FIG. 4. The process of Step S113 is repeated until the user 70 arrives at the meeting location 80 (Step S137).

As described above, the following actions and effects can be achieved by means of the management server 20 according to the present embodiment.

The management server 20 is equipped with the location information acquisition unit 213, the first required time calculation unit (the required time calculation unit 214), the route calculation unit (the walking route calculation unit 215), the second required time calculation unit (the required time calculation unit 214), the determination unit 216, and the output unit (the communication I/F 23).

The location information acquisition unit 213 acquires the location information of the communication device 60 in the possession of the user 70 as well as the location information of the taxi 40 dispatched in accordance with the dispatch request of the user 70. The first required time calculation unit calculates, based on the location information of the taxi 40, the first required time or time required for the taxi 40 to arrive at the meeting location 80 where the user 70 who requested the dispatch is to board.

The route calculation unit calculates, based on the location information of the communication device 60, a plurality of routes from the current location of the user 70 to the meeting location 80. The second required time calculation unit calculates a second required time, which is the time required to arrive at the meeting location from the current location of the user, for each of the plurality of routes calculated by the route calculation unit.

If a second required time is the same as or shorter than the first required time, the determination unit 216 determines that the route associated with the second required time is a route via which the taxi 40 could be met on time. The output unit causes the communication device 60 to output information indicating the route or routes determined by the determination unit 216 to be thee route or routes via which the taxi 40 could be met on time.

As a result, as shown in FIG. 4, the user 70 can be presented with the plurality of the walking routes R1 to R3 via which the taxi 40 could be met on time, thereby allowing the user 70 to select a preferred route from the plurality of the walking routes R1 to R3. This increases the number of options that the user 70 can choose from when the user departs for the meeting location 80.

First Modified Example

DETAILED DESCRIPTION OF The first modified example of the present embodiment will now be described with reference to FIG. 6.

Figure 6:
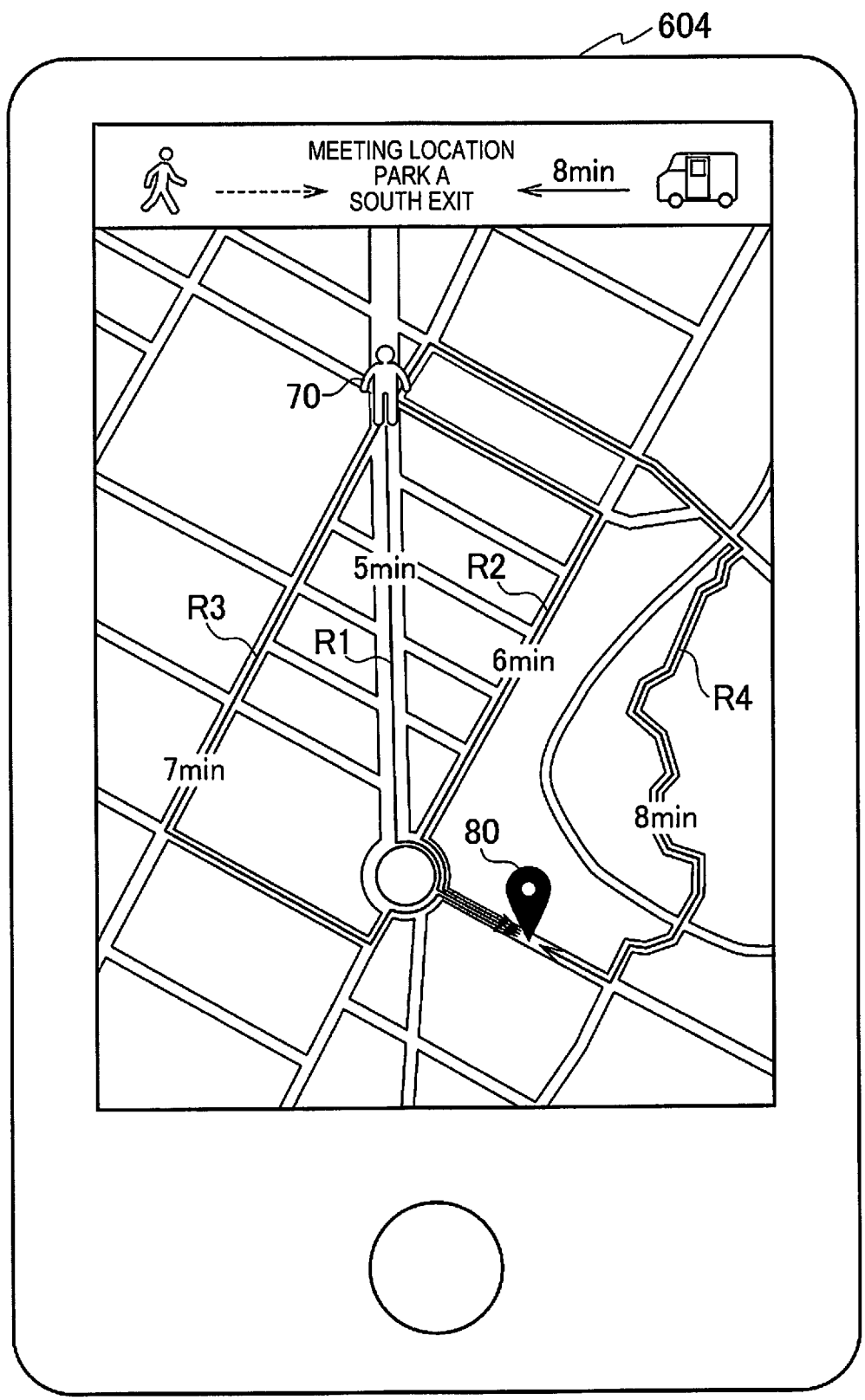
FIG. 6 is a diagram explaining a first modified example of a walking route displayed on a display 604.

As shown in FIG. 6, when the management server 20 transmits a signal indicating the walking routes R1 to R4 to the communication device 60, the management server may also transmit a signal indicating the second required times associated with the walking routes R1 to R4 to the communication device 60.

As a result, as shown in FIG. 6, the walking routes R1 to R4 acquired from the management server 20 and the second required times associated with the walking routes R1 to R4 are displayed on the display 604 of the communication device 60. In the following description, it is assumed that the second required times for traversing the walking routes have been calculated as 5 minutes for the walking route R1, 6 minutes for the walking route R2, 7 minutes for the walking route R3, and 8 minutes for the walking route R4.

In the same manner as the example shown in FIG. 3, the walking routes R1 to R3 are walking routes via which the meeting location 80 can be reached within the first required time. Further, in FIG. 6 onwards, walking route R4 is also a walking route via which the meeting location 80 can be reached within the first required time. Because the second required time (8 minutes) associated with the walking route R4 is the same as the first required time (8 minutes), the determination unit 216 determines that walking route R4 is a walking route via which the meeting location 80 can be reached within the first required time.

As shown in FIG. 6, because walking routes R1 to R4 and the second required times associated with the walking routes R1 to R4 are displayed on the display 604, the user 70, when choosing between the walking routes, can ascertain at a glance the associated walking times. The user 70 can select his or her preferred route from the walking routes R1 to R4 in consideration of the walking time.

Second Modified Example

The second modified example of the present embodiment will now be described with reference to FIG. 7.

In the second modified example, the required time calculation unit 214 calculates a margin time. The margin time is the time in minutes that indicates how much longer it will take the taxi 40 to arrive at the meeting location 80 after the user 70 has arrived at the meeting location 80. The margin time is calculated by subtracting the second required time from the first required time (8 minutes). Since the second required times to traverse the walking routes are 5 minutes for the walking route R1, 6 minutes for the walking route R2, 7 minutes for the walking route R3, and 8 minutes for the walking route R4, as shown in FIG. 7, the margin times associated with traversing the walking routes are 3 minutes for the walking route R1, 2 minutes for the walking route R2, 1 minute for the walking route R3, and 0 minutes for the walking route R4. The margin times are associated with the corresponding walking routes in the same manner as are the second required times.

The longer the margin time, the less hurried the pace of the user 70 as he/she moves toward the meeting location 80. The shorter the margin time, on the other hand, the less extra time available to the user 70. For example, if the margin time is 0 minutes, as is the case with the walking route R4, the user 70 understands that there is no time to waste; the user 70 may therefore avoid selecting the walking route R4, or may decide to select walking route R4 and set out immediately, moving quickly, not stopping along the way, heeding the time, etc., as he/she moves toward the meeting location 80.

In the second modified example, when the management server 20 transmits a signal indicating the walking routes R1 to R4 to the communication device 60, the management server also transmits a signal indicating the margin times associated with the walking routes R1 to R4 to the communication device 60.

Figure 7:
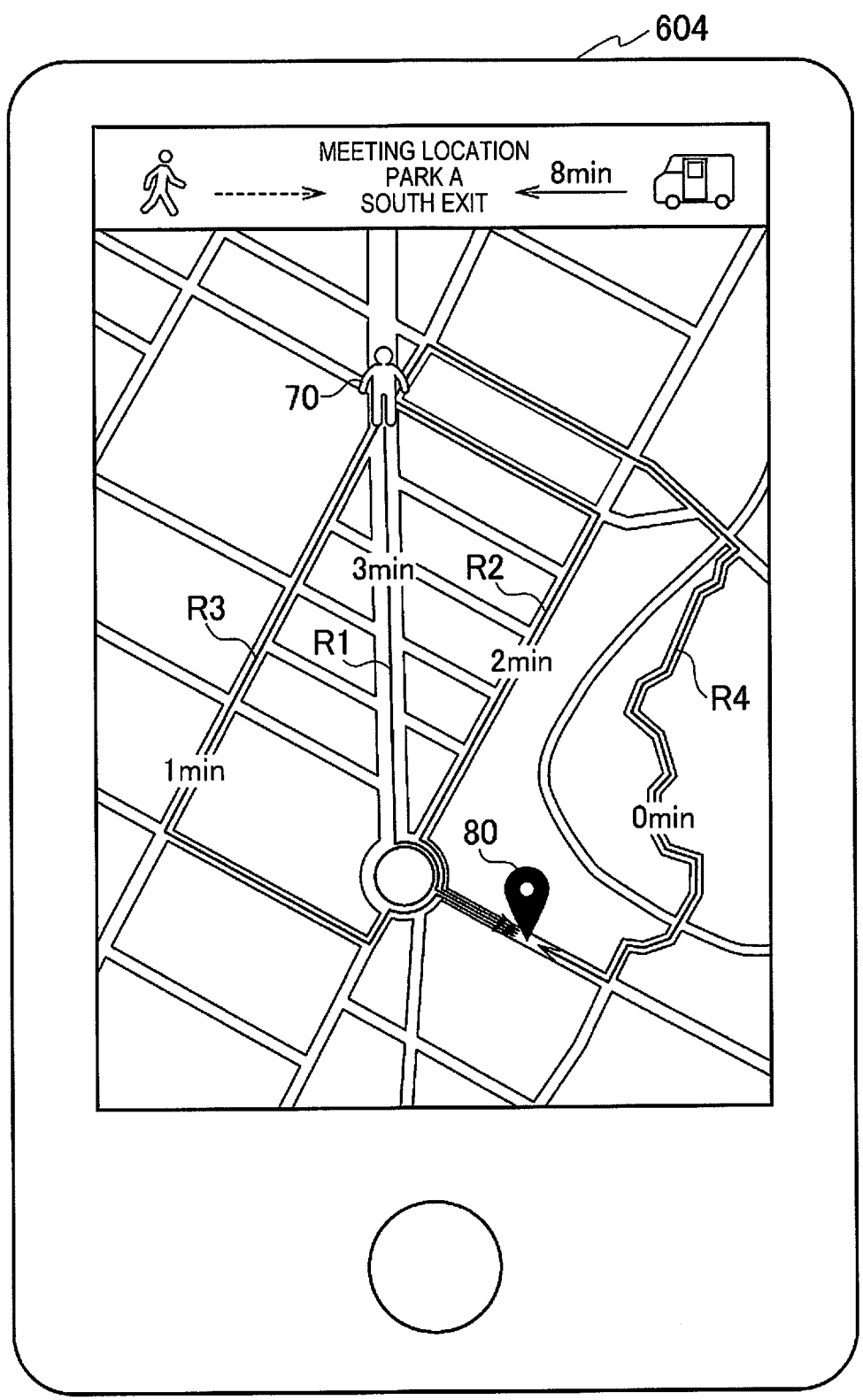
FIG. 7 is a diagram explaining a second modified example of a walking route displayed on a display 604.

As a result, as shown in FIG. 7, the walking routes R1 to R4 acquired from the management server 20 and the margin times associated with the walking routes R1 to R4 are displayed on the display 604 of the communication device 60. The display allows the user 70 to ascertain at a glance the margin time for each walking route that may be selected. Thus, the user 70 can base their selection of walking routes R1 to R4 on the margin time.

Third Modified Example

The third modified example of the present embodiment will now be described with reference to FIG. 8.

When the user 70 departs for the meeting location 80, the user may be able to take side roads, branch roads, etc., depending the condition of the roads. Reference numerals 90, 91 shown in FIG. 8 are arrows that indicate the directions that can be taken at side roads and branch roads. Consider the walking routes R1 and R3, for example. At the side and branch roads between the walking routes R1 and R3, arrow 91 indicates that it would be possible to take the walking route R1 to the walking route R3, or the walking route R3 to the walking route R1. More specifically, arrow 91 indicates that whether the user were to take the walking route R1 to the walking route R3 or the walking route R3 to the walking route R1, it would be possible to meet the taxi 40 on time.

In contrast, arrows 90 indicate that it is possible to take the walking route R3 to the walking route R1, but not the walking route R1 to the walking route R3. More specifically, arrows 90 indicate that if the user were to take the walking route R3 to the walking route R1, it would be possible to meet the taxi 40 on time, but if the user were to take the walking route R1 to the walking route R3, it would not be possible to meet the taxi 40 on time.

The same applies to arrows 90, 91 for the side roads and branch roads between the walking route R1 and the walking route R2, as well as to arrows 90, 91 for the side roads and branch roads between the walking route R2 and the walking route R4; thus, their descriptions have been omitted.

In the third modified example, when transmitting a signal indicating the walking routes R1 to R4 to the communication device 60, the management server 20 also transmits a signal indicating the arrows that indicate the directions that can be taken at the side roads and branch roads.

Figure 8:
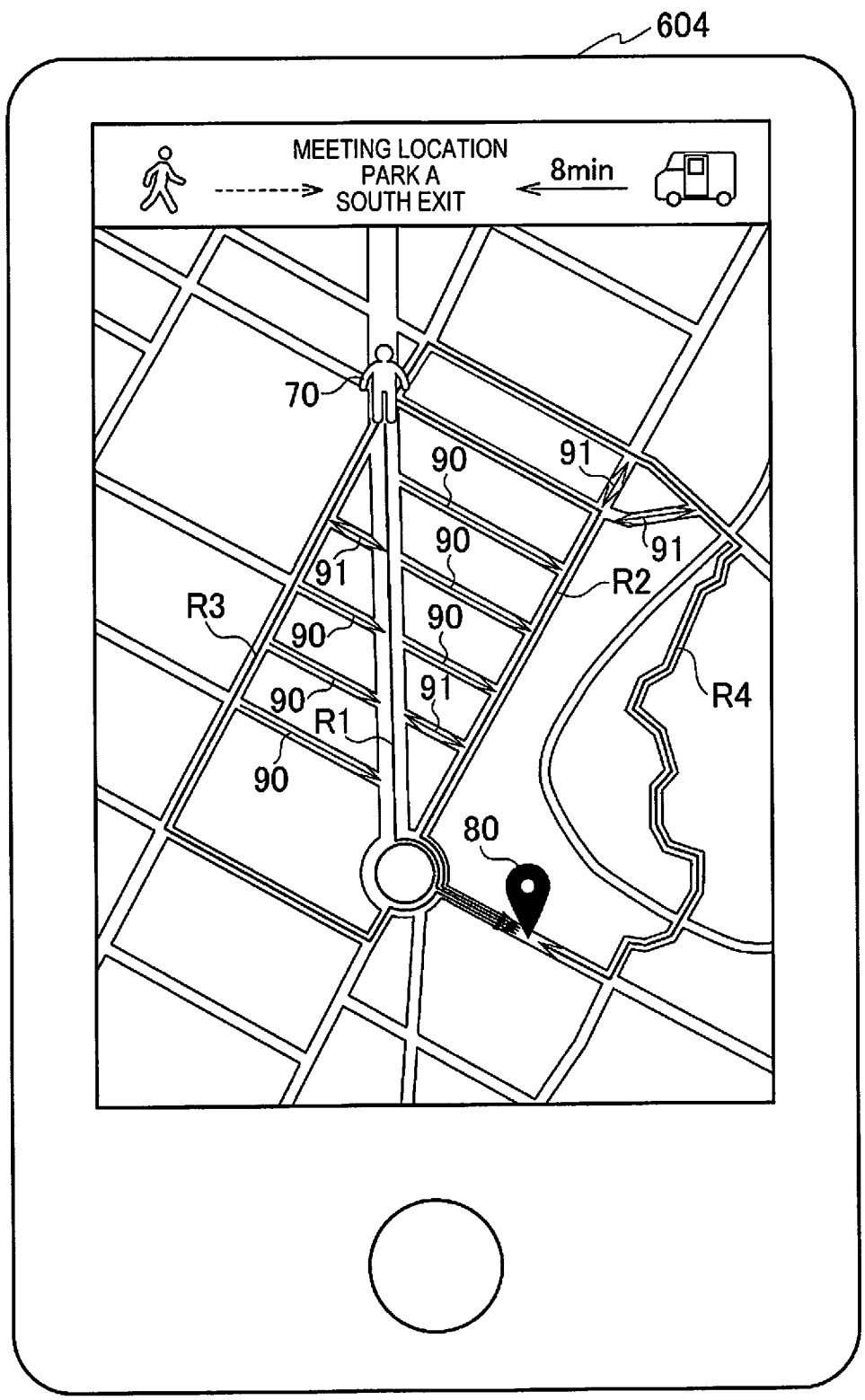
FIG. 8 is a diagram explaining a third modified example of a walking route displayed on a display 604.

As a result, as shown in FIG. 8, the walking routes R1 to R4 acquired from the management server 20 and arrows 90, 91 that indicate the directions that can be taken at the side roads and branch roads are displayed on the display 604 of the communication device 60. The display allows the user 70 to ascertain at a glance the direction to take at the side roads and branch roads, and how to proceed on the preferred side roads and branch roads. This gives the user more movement-related options when the user 70 departs for the meeting location 80.

Fourth Modified Example

The fourth modified example of the present embodiment will now be described with reference to FIG. 9.

Roads available to the user 70 may be hilly, have stairs, pedestrian crossing bridges, etc. Hills, stairs, pedestrian crossing bridges, etc., are elements that impose a greater burden of movement compared with flat routes. Depending on the user 70, there may be a need to avoid traversing hills, stairs, pedestrian crossing bridges, etc. As an example, such a need may arise for a user 70 who uses a wheelchair. In Fourth Modified example, if a walking route set by the walking route setting unit 217 includes hills, stairs, pedestrian crossing bridges, etc., when the management server 20 transmits a signal indicating the walking routes R1 to R4 to the communication device 60, a signal indicating that the presence of the hills, stairs, pedestrian crossing bridges, etc., is also transmitted to the communication device 60.

The particulars will be described with reference to FIG. 9. It is assumed that there are stairs on the walking route R4 shown in FIG. 9. In this case, when transmitting the signal indicating the walking routes R1 to R4 to the communication device 60, the management server 20 also transmits a signal indicating that there are stairs on the walking route R4 to the communication device 60. When the communication device 60 receives these signals, as shown in FIG. 9, the walking routes R1 to R3 are displayed as ordinary lines, whereas the walking route R4 is displayed as a dotted line on the display 604. If it is set in advance, as a display rule, that walking routes indicated by dotted lines mean that there are stairs, the user 70 can ascertain at a glance that there are stairs on the walking route R4. As described above, in the case that the user 70 uses a wheelchair, the user 70 can avoid stairs by selecting the walking routes R1 to R3.

Figure 9:
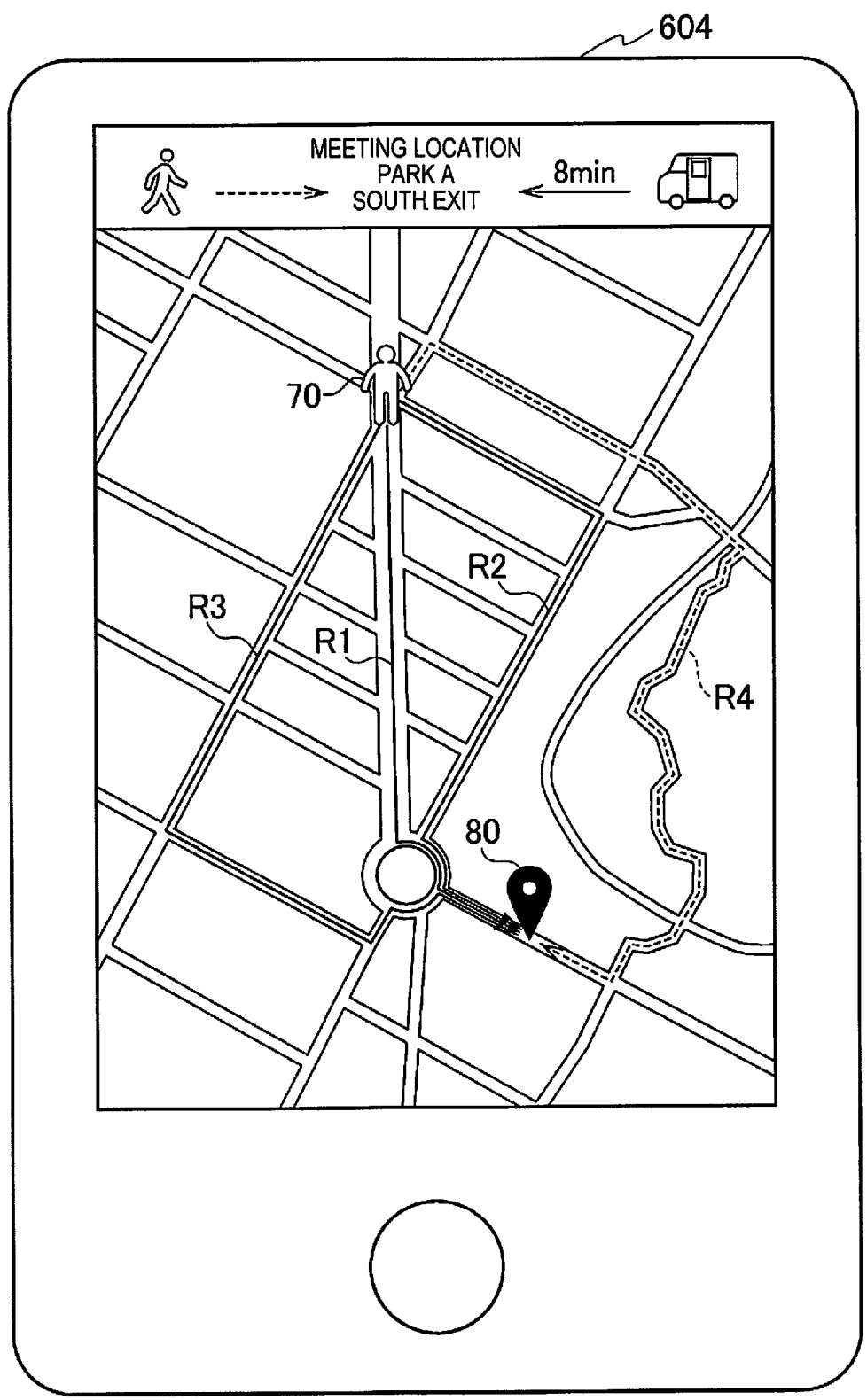
FIG. 9 is a diagram explaining a fourth modified example of a walking route displayed on a display 604.

The walking route on which there are stairs is indicated by the dotted line in FIG. 9, but the display example is not limited in this way. Walking routes on which there are stairs may be displayed with a thick line or a one-dotted chain line. Walking routes on which there are stairs and flat walking routes may be distinguished by color. As an example, walking routes with stairs may be displayed in red, while flat walking routes are displayed in green. Further, the display may be different for hills, stairs, and pedestrian crossing bridges.

Further, the management server 20 (the determination unit 216) can refer to the map database 241 in order to determines whether there are hills, stairs, pedestrian crossing bridges, etc., on the walking routes R1 to R4. The means of transportation of the user 70 includes walking, use of a wheelchair, bicycling, and running (running).

The management server 20 may compare the heights of the walking routes R1 to R4 (plurality of routes) with respect to a horizontal plane in order to determine if there is an element that imposes a high burden of movement. Specifically, the management server 20 may determine that there is an element that imposes a high burden of movement when the height of a certain route (the walking route R4 of FIG. 9) with respect to a horizontal plane is higher or lower than that of another route (the walking routes R1 to R3 of FIG. 9).

Fifth Modified Example

Figure 10:
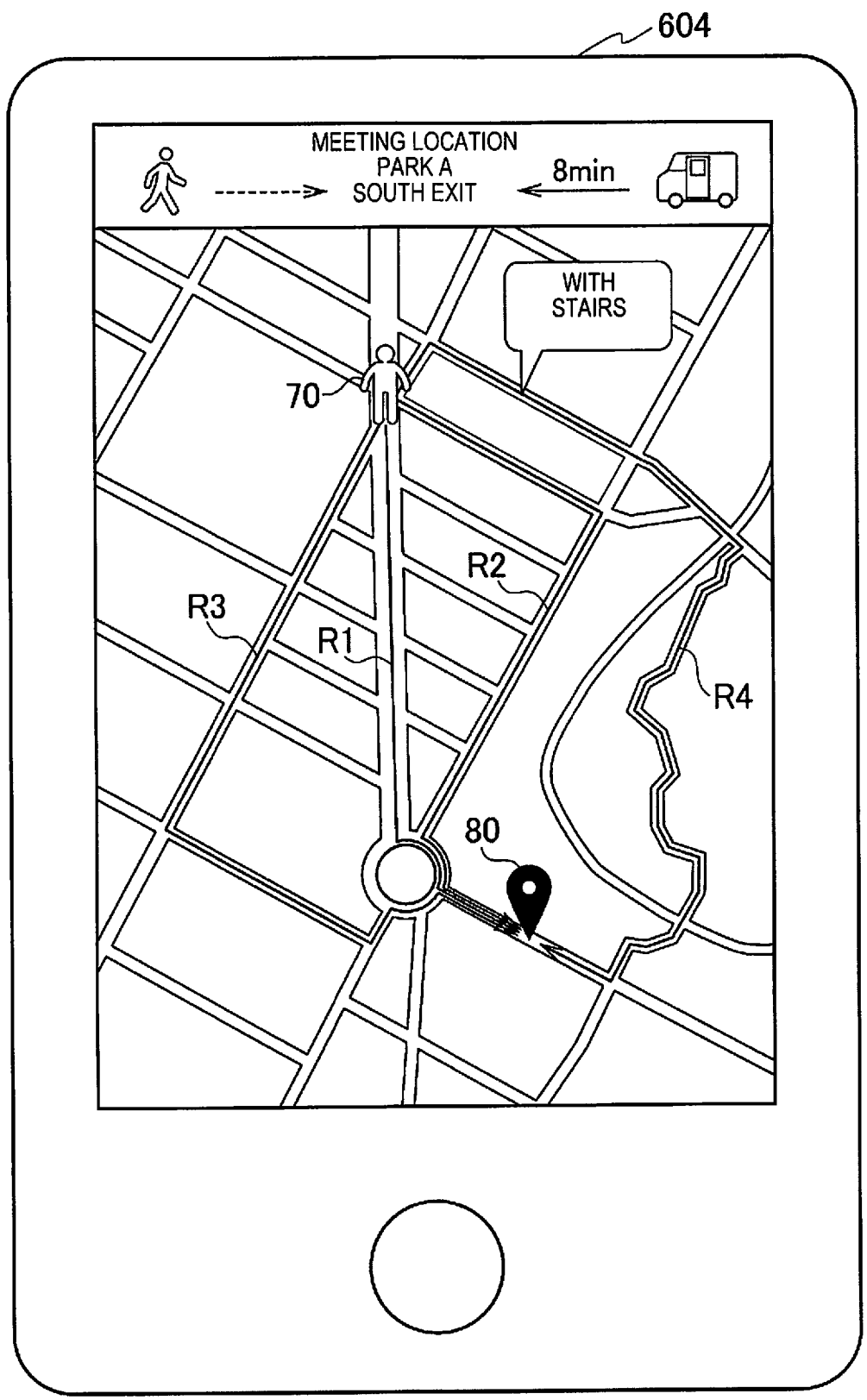
FIG. 10 is a diagram explaining a fifth modified example of a walking route displayed on a display 604.

The fifth modified example of the present embodiment will now be described with reference to FIG. 10.

In the fourth modified example described above, if there are stairs on the walking route R4, the walking route R4 is displayed using a dotted line. The method of presenting to the user 70 that the walking route R4 has stairs is not limited in this way. As shown in FIG. 10, a balloon indicating the walking route R4 may display the words "with stairs." By use of this display, the user 70 can ascertain at a glance that there are stairs on the walking route R4.

As an operation example of the management server 20 in the fifth modified example, when transmitting the signal indicating the walking routes R1 to R4 to the communication device 60, the management server 20 also transmits a signal (signals for displaying a balloon) indicating that there are stairs on the walking route R4 to the communication device 60.

Sixth Modified Example

Figure 11:
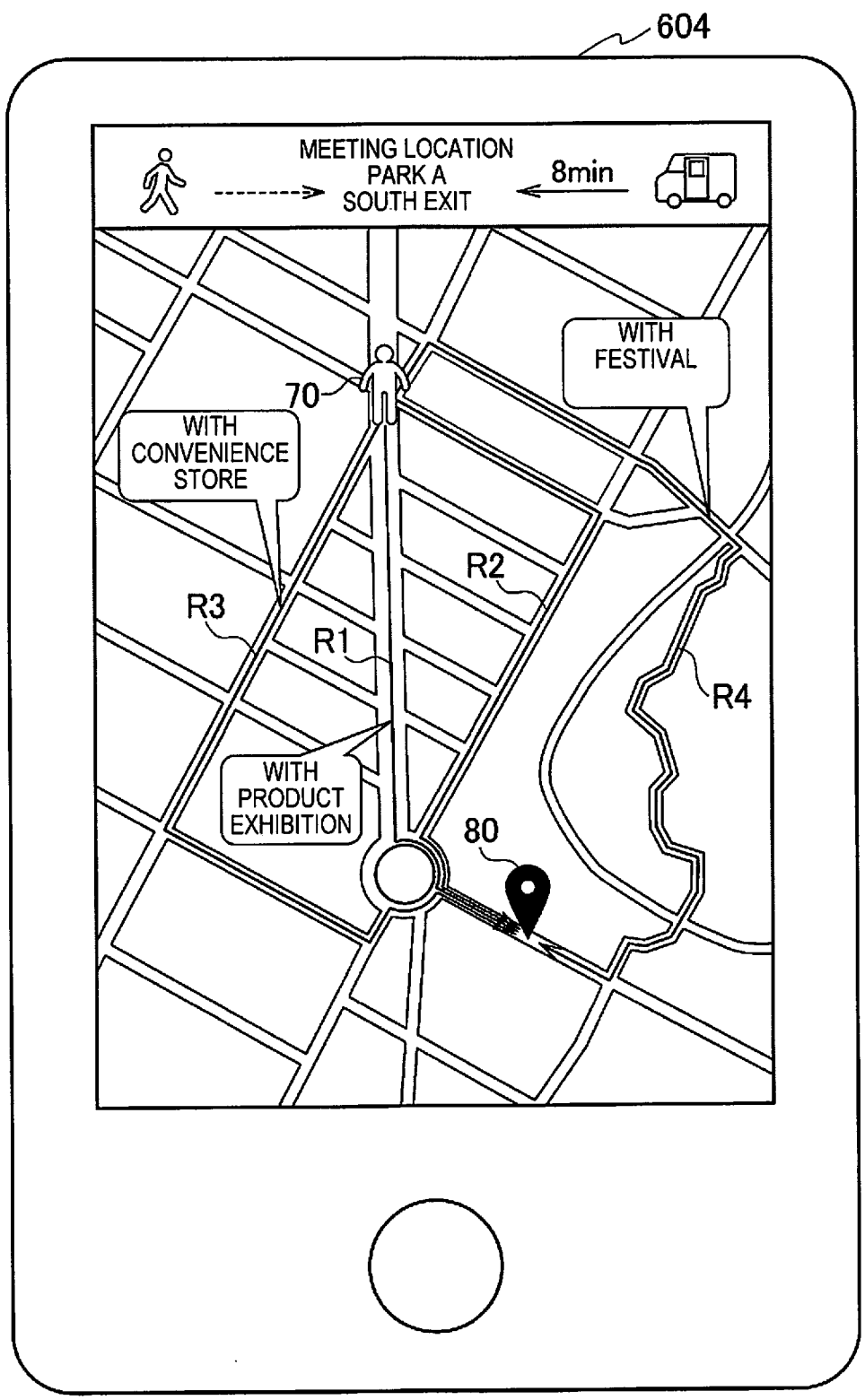
FIG. 11 is a diagram explaining a sixth modified example of a walking route displayed on a display 604.

The sixth modified example of the present embodiment will now be described with reference to FIG. 11.

Roads available to the user 70 include sidewalks, roads in parks, station yards, etc. There are cases in which stores such as convenience stores are present, or events such as product exhibits and festivals taking place in such areas. For example, as shown in FIG. 11, it is assumed that a convenience store is present on the walking route R3, that a product exhibition is taking place on the walking route R1, and that a festival is being held on the walking route R4.

In this case, when transmitting the signal indicating the walking routes R1 to R4 to the communication device 60, the management server 20 also transmits a signal indicating store information and event information on the walking routes R1 to R4 to the communication device 60. By means of the communication device 60 receiving these signals, as shown in FIG. 11, balloons indicating that a convenience store is present on the walking route R3, that a product exhibition is taking place on the walking route R1, and that a festival is being held on the walking route R4, are displayed on the display 604.

Users who like to purchase local specialty goods at product exhibitions can satisfy their needs by selecting walking route R1. Alternatively, by selecting walking route R4, users who like to see festivals would be able to do so as they travel toward the meeting location 80. In this manner, when a plurality of the walking routes R1 to R4 is displayed, store and event information associated with these walking routes can also be displayed, thereby providing the user 70 with a wide range of options.

The management server 20 (information acquisition unit) can obtain information pertaining to stores, such as convenience stores, by referring to the map database 241. Further, with regard to event information such as product exhibitions and festivals, the management server 20 (information acquisition unit) can use the location information of the user 70 to search for and obtain event information on the Internet for the area where the user 70 is located. Both store information and event information may be displayed, as shown in FIG. 11, or only one may be displayed.

Further, when store information and event information is displayed on the walking routes using balloons, the margin time described above may also be displayed, as shown in FIG. 12. This makes it easier for the user 70 to arrive at such decisions as, "I can't stop at the convenience store on the walking route R3 since it only gives me one extra minute, but I can stop at the product exhibition on the walking route R1 since it gives me three extra minutes." Note that. As an operation example of the management server 20 in this case, when transmitting the signal indicating the walking routes R1 to R4 to the communication device 60, the management server 20 also transmits a signal indicating store information and event information associated with the walking routes R1 to R4, as well as the signal indicating the margin times associated with the walking routes R1 to R4, to the communication device 60.

Figure 12:
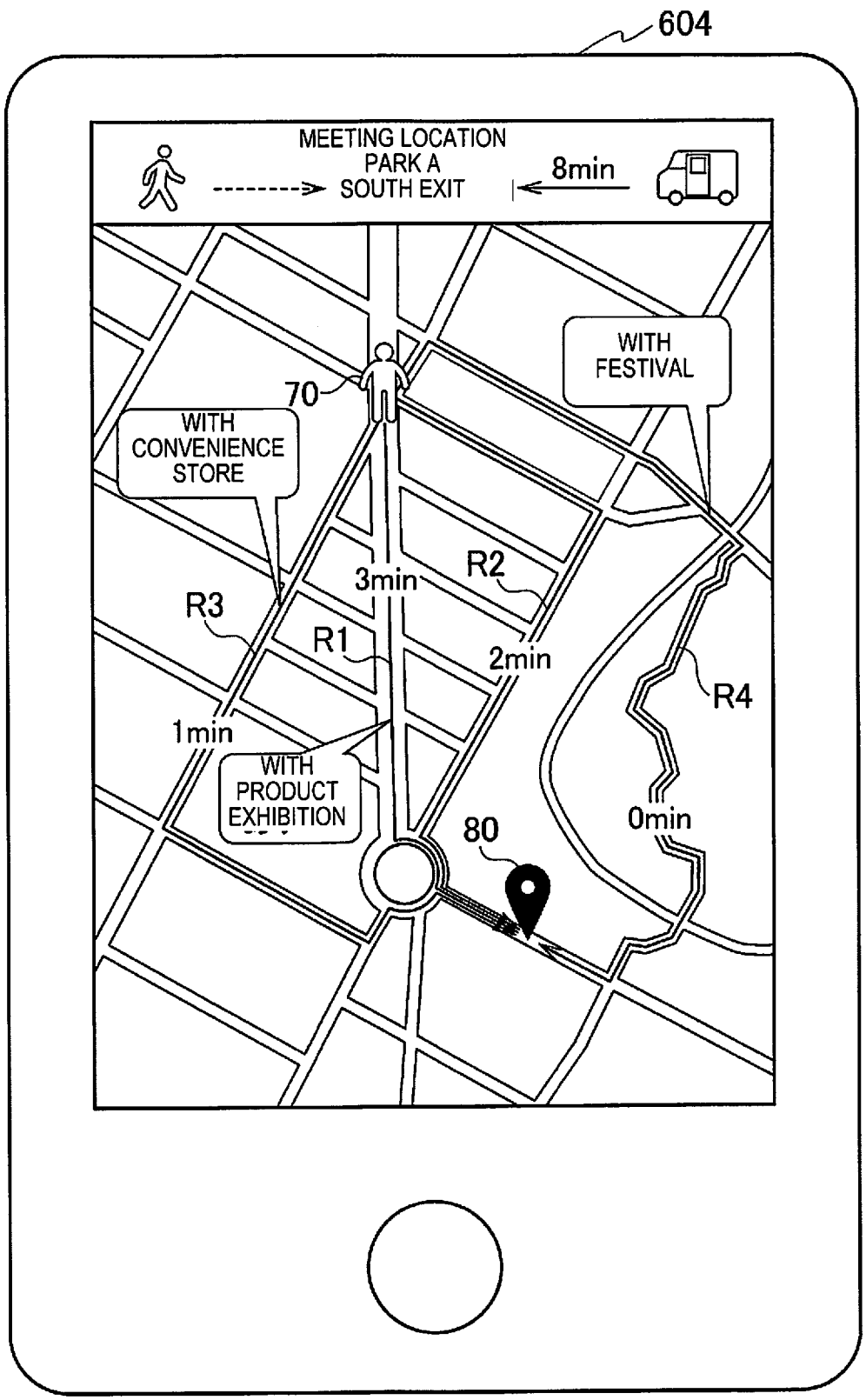
FIG. 12 is a diagram explaining the sixth modified example of a walking route displayed on a display 604.
Figure 13:
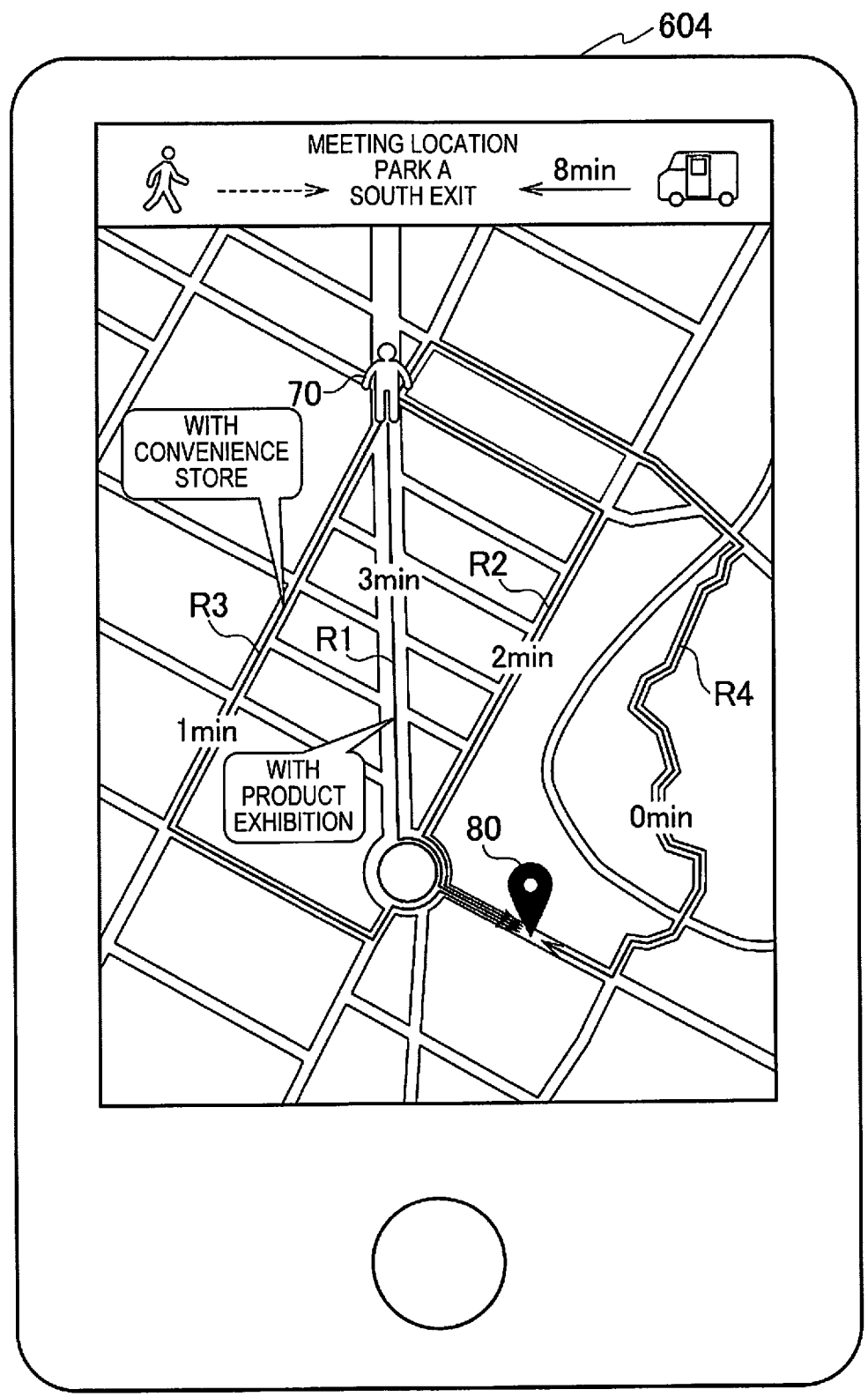
FIG. 13 is a diagram explaining the sixth modified example of a walking route displayed on a display 604.

In the display example of FIG. 12, a festival is being held along walking route R4, but the margin time here is 0 minutes, so that even if the user 70 were to select walking route R4 to see the festival, there would be no time to do so. Therefore, as shown in FIG. 13, if the margin time is shorter than a prescribed time, the display may exclude the display of store and event information on the walking route. In other words, store and event information on the walking route may be displayed only when the margin time is greater than or equal to a prescribed time. As an operation example of the management server 20 in this case, when transmitting a signal indicating the walking routes R1 to R4 to the communication device 60, the management server 20 also transmits a signal indicating store and event information on the walking routes R1 to R4, as well as a signal indicating the margin times associated with the walking routes R1 to R4 to the communication device 60. The management server 20 also transmits to the communication device 60 a signal indicating whether the margin time is shorter than the prescribed time to the communication device 60. The prescribed time is not particularly limited, but may be 30 seconds, for example.

Each of the functions described in the embodiments above may be implemented by means of one or more processing circuits. The processing circuits include programmed processing devices, such as processing devices including electronic circuits. The processing circuits also include such devices as application-specific integrated circuits (ASIC) and electronic components arranged to execute the described functions.

Embodiments of the present invention have been described above, but the descriptions and figures that form part of this disclosure should not be understood as limiting the present invention. From this disclosure, various alternative embodiments, examples, and operating techniques should be apparent to those skilled in the art.

Figure 14:
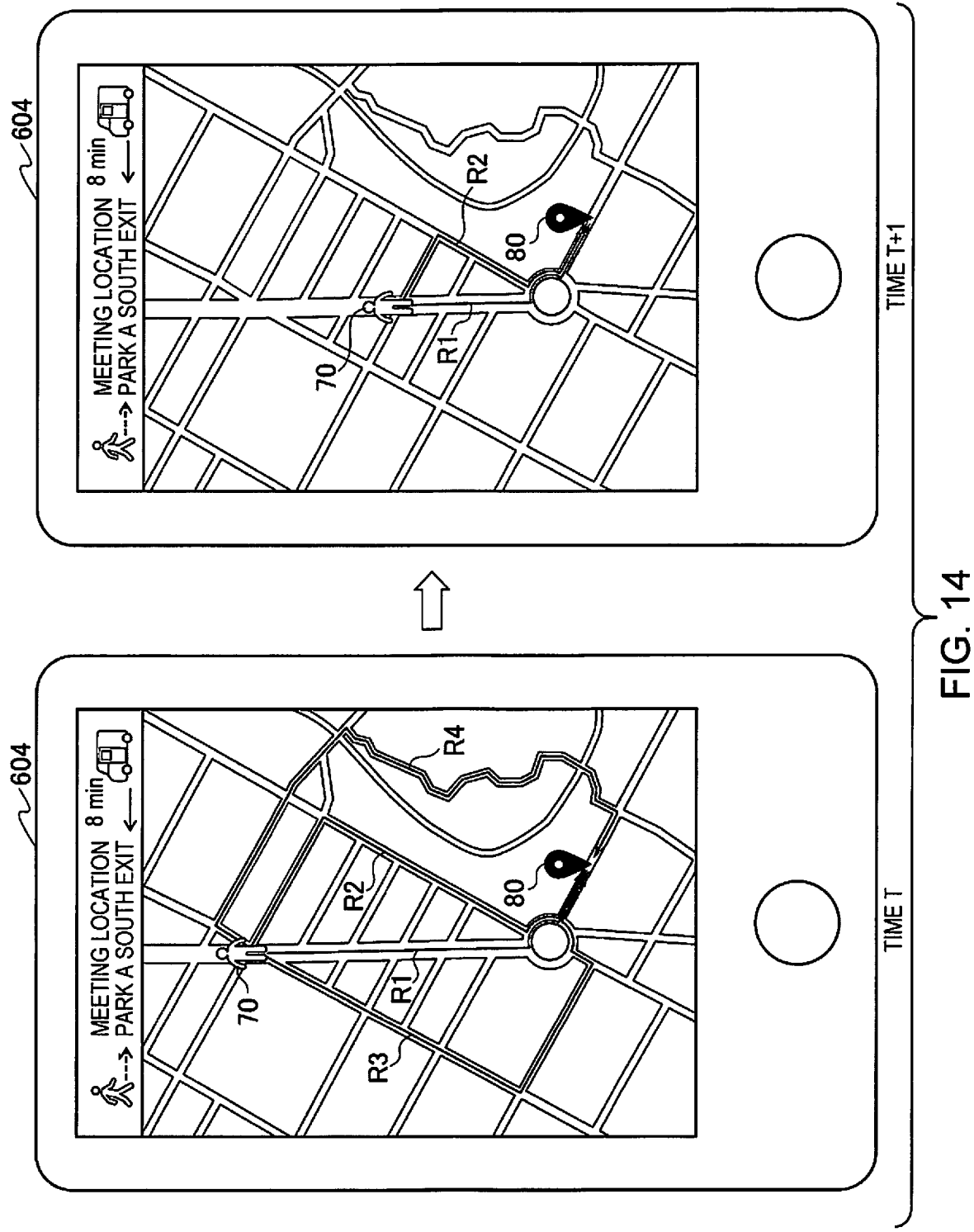
FIG. 14 is a diagram explaining another example of a walking route displayed on a display 604.

The walking routes may be set from time to time in accordance with the current location of the user 70, rather than being established once in a final form. As shown in FIG. 14, the current location of the user 70 changes from one time to the next as the user advances from the state at time T to the state at time T+1. The walking route setting unit 217 may set the walking route in accordance with the current location of the user 70, which changes from time to time. The user 70 can thereby select a walking route that is different from the walking route that was initially selected.

Further, in the embodiment described above, the entity that transmits to the communication device 60 prescribed signals for causing the communication device 60 to output (display) the plurality of walking routes, the margin times, etc., is described as the management server 20, but no limitation is implied thereby. The entity that transmits to the communication device 60 prescribed signals for causing the communication device 60 to output the plurality of walking routes, the margin times, etc., may be the communication device 60 itself or the taxi 40.

Figure 15:
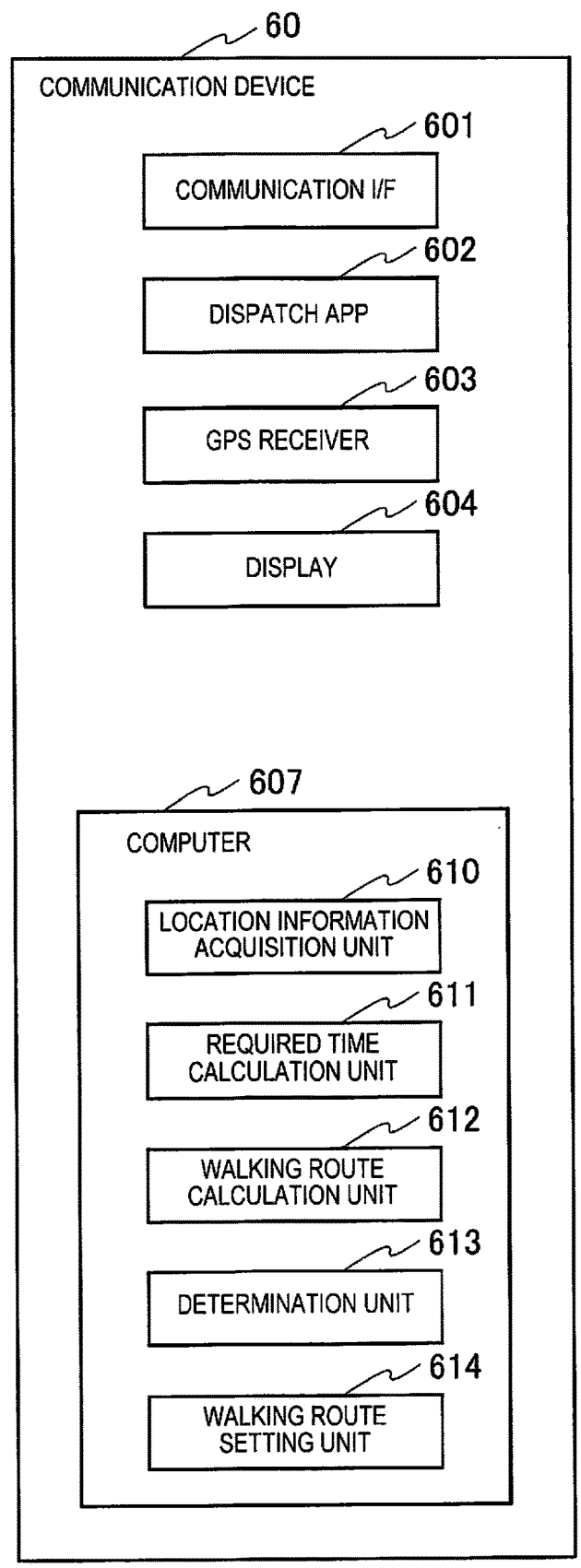
FIG. 15 is a functional block diagram of a modified example of the communication device 60.

When the communication device 60 is set as the entity that transmits to the communication device 60 prescribed signals for causing the communication device 60 to output the plurality of walking routes, the margin times, etc., as shown in FIG. 15, a computer 607 installed in the communication device 60 may function as a location information acquisition unit 610, a required time calculation unit 611, a walking route calculation unit 612, a determination unit 613, and a walking route setting unit 614. These functions of the location information acquisition unit 610, the required time calculation unit 611, the walking route calculation unit 612, the determination unit 613, and the walking route setting unit 614 are the same as those of the location information acquisition unit 213, the required time calculation unit 214, the walking route calculation unit 215, the determination unit 216, and the walking route setting unit 217 shown in FIG. 2. In this case, the communication device 60 can be said to be a device that outputs to the communication device 60 prescribed signals for causing the communication device 60 to output the plurality of walking routes, the margin times, etc.

Figure 16:
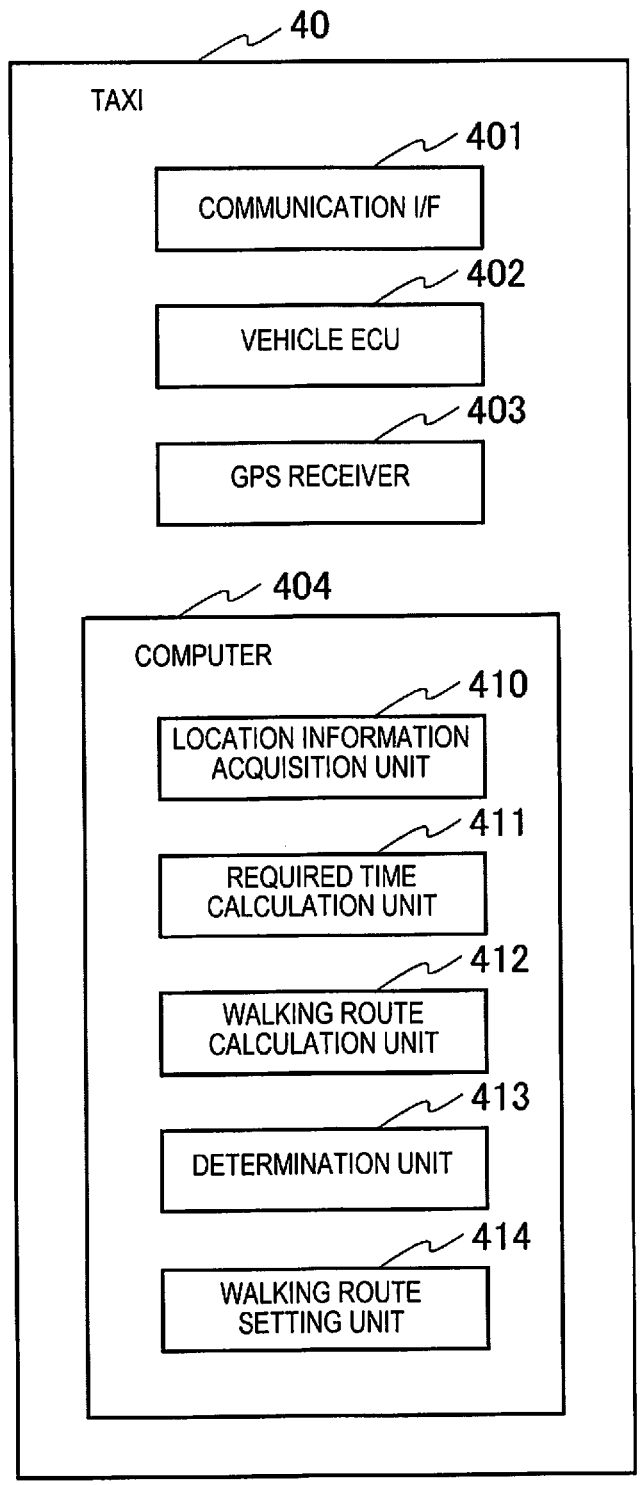
FIG. 16 is a functional block diagram of a modified example of a computer mounted on the taxi 40.

On the other hand, when the taxi 40 is set as the entity that transmits to the communication device 60 prescribed signals for causing the communication device 60 to output the plurality of walking routes, the margin times, etc., as shown in FIG. 16, a computer 404 installed in the taxi 40 may function as a location information acquisition unit 410, a required time calculation unit 411, a walking route calculation unit 412, a determination unit 413, and a walking route setting unit 414. These functions of the location information acquisition unit 410, the required time calculation unit 411, the walking route calculation unit 412, the determination unit 413, and the walking route setting unit 414 are the same as those of the location information acquisition unit 213, the required time calculation unit 214, the walking route calculation unit 215, the determination unit 216, and the walking route setting unit 217 shown in FIG. 2. The management server 20, the computer 607 installed in the communication device 60, and the computer 404 installed in the taxi 40 correspond to the movement assistance device.

The entire contents of Japanese Patent Application No. 2020-060535 (Filing date: Mar. 30, 2020) are incorporated herein.

DESCRIPTIONS OF THE REFERENCE NUMERALS

10 Movement assistance system
20 Management server
30 Communication network
40-42 Taxis
60 Communication device
70 User
211 Dispatch acceptance unit
212 Assignment unit
213 Location information acquisition unit
214 Required time calculation unit
215 Walking route calculation unit
216 Determination unit
217 Walking route setting unit
241 Map database

The invention claimed is:
1. A movement assistance device comprising:
a location information acquisition unit configured to acquire location information of a communication device possessed by a user and location information of a vehicle dispatched in accordance with a dispatch request by the user;
a first required time calculation unit configured to calculate, based on location information of the vehicle, a first required time until the vehicle arrives at a meeting location where the user who made the dispatch request is to board the vehicle;

a route calculation unit configured to calculate, based on the location information of the communication device, a plurality of routes from a current location of the user to the meeting location;

a second required time calculation unit configured to calculate a second required time from the current location of the user to the meeting location for each of the plurality of routes calculated by the route calculation unit, thereby obtaining a plurality of second required times;

a determination unit configured to determine whether the plurality of routes includes at least one via which the vehicle could be met on time, a route among the plurality of routes being determined to enable the vehicle to be met on time when the second required time associated with the route is the same as or shorter than the first required time; and an output unit configured to cause the communication device to output information indicating the at least one route via which the vehicle could be met on time, the determination unit being further configured to determine whether the at least one route via which the vehicle could be met on time includes a first route and a second route as routes via which the vehicle could be met on time, whether there is a third route that connects the first route and the second route, whether the vehicle could be met on time by taking the third route in a first direction from the first route to the second route to reach the meeting location, and whether the vehicle could be met on time by taking the third route in a second direction from the second route to the first route to reach the meeting location and the output unit being further configured to output information indicating the third route in a different format depending on whether the vehicle could be met on time by taking the third route in the first direction, by taking the third route in the second direction, or by taking the third route in either of the first direction and the second direction.

2. The movement assistance device according to claim 1, wherein the determination unit is configured to determine whether the at least one route via which the vehicle could be met on time includes an element that imposes a high burden of movement, and the output unit is configured to cause the communication device to output information indicating the element upon the determination unit determining that the element is present.

3. The movement assistance device according to claim 1, further comprising an information acquisition unit is configured to acquire store information or event information associated with the at least one route via which the vehicle could be met on time, wherein the output unit is configured to cause the communication device to output the store information or the event information acquired by the information acquisition unit.

4. The movement assistance device according to claim 3, wherein the first required time calculation unit is configured to subtract the second required time from the first required time to calculate a margin time, and the output unit is configured to cause the communication device to output information indicating the margin time calculated by the first required time calculation unit.

5. The movement assistance device according to claim 4, wherein the output unit is configured to cause the communication device to output the store information or the event information pertaining to a route associated with the margin time only if the margin time is greater than or equal to a prescribed time.

6. A movement assistance method comprising:

Acquiring location information of a communication device possessed by a user and location information of a vehicle dispatched in accordance with dispatch request by the user;

calculating, based on the location information of the communication device, a plurality of routes from a current location of the user to the meeting location;

calculating a second required time from the current location of the user to the meeting location for each of the plurality of calculated routes, thereby obtaining a plurality of second required times;

determining whether the plurality of routes includes at least one via which the vehicle could be met on time, a route among the plurality of routes being determined to enable the vehicle to be met on time when the second required time associated with the route is the same as or shorter than the first required time; and causing the communication device to output information indicating the at least one route via which the vehicle could be met on time, further comprising:

determining whether the at least one route via which the vehicle could be met on time includes a first route and a second route as routes via which the vehicle could be met on time, whether there is a third route that connects the first route and the second route, whether the vehicle could be met on time by taking the third route in a first direction from the first route to the second route to reach the meeting location, and whether the vehicle could be met on time by taking the third route in a second direction from the second route to the first route to reach the meeting location; and outputting information indicating the third route in a different format depending on whether the vehicle could be met on time by taking the third route in the first direction, by taking the third route in the second direction, or by taking the third route in either of the first direction and the second direction.

* * * * *